United States Patent
Rose et al.

(10) Patent No.: US 10,061,776 B2
(45) Date of Patent: *Aug. 28, 2018

(54) SYSTEM AND METHOD FOR IDENTIFICATION AND CONSOLIDATION OF RELATED CONCURRENT DOCUMENT SESSIONS

(71) Applicant: Google Inc., Mountain View, CA (US)

(72) Inventors: Robert Brett Rose, Boulder, CO (US); Michael Jeffrey Procopio, Boulder, CO (US)

(73) Assignee: GOOGLE LLC, Mountain View, CA (US)

(*) Notice: Subject to any disclaimer, the term of this patent is extended or adjusted under 35 U.S.C. 154(b) by 56 days.

This patent is subject to a terminal disclaimer.

(21) Appl. No.: 15/217,501

(22) Filed: Jul. 22, 2016

(65) Prior Publication Data

US 2016/0328416 A1 Nov. 10, 2016

Related U.S. Application Data

(63) Continuation of application No. 14/315,277, filed on Jun. 25, 2014, now Pat. No. 9,413,739.

(51) Int. Cl.
*H04L 29/06* (2006.01)
*G06F 17/30* (2006.01)
*G06F 21/62* (2013.01)
*G06F 21/31* (2013.01)

(52) U.S. Cl.
CPC .... *G06F 17/30165* (2013.01); *G06F 17/3056* (2013.01); *G06F 21/6218* (2013.01); *H04L 63/08* (2013.01); *H04L 65/403* (2013.01); *G06F 21/31* (2013.01)

(58) Field of Classification Search
CPC ... H04L 63/08; H04L 65/403; G06F 21/6218; G06F 21/31; G06F 17/24; G06F 17/241–17/246
See application file for complete search history.

(56) References Cited

U.S. PATENT DOCUMENTS

| | | | |
|---|---|---|---|
| 6,516,339 B1 | 2/2003 | Potts, Jr. et al. | |
| 8,453,052 B1 * | 5/2013 | Newman | G06F 17/2211 715/255 |
| 8,768,893 B2 * | 7/2014 | Drews | G06F 17/30699 707/687 |
| 2008/0244374 A1 * | 10/2008 | Hattori | G06T 11/001 715/202 |
| 2009/0138806 A1 * | 5/2009 | Galvin | G06Q 10/107 715/753 |

(Continued)

OTHER PUBLICATIONS

Office Action dated Aug. 26, 2015 in U.S. Appl. No. 14/315,277, (19 pages).

*Primary Examiner* — Hadi S Armouche
*Assistant Examiner* — Shaqueal D Wade
(74) *Attorney, Agent, or Firm* — Lowenstein Sandler LLP

(57) ABSTRACT

A cloud computing system identifies opportunities for users to collaborate on a file. Collaboration opportunities are identified based on similarity of separate files that different users are associated with, and on relationships or similarities between the different users. If users associated with the separate files agree to collaborate, the users may be placed in a single editing session regarding a file having content from at least one of the separate files.

20 Claims, 7 Drawing Sheets

(56) References Cited

U.S. PATENT DOCUMENTS

| | | | |
|---|---|---|---|
| 2012/0290926 A1* | 11/2012 | Kapadia | G06F 17/24 715/255 |
| 2013/0019148 A1* | 1/2013 | Lee | G06F 17/2229 715/202 |
| 2014/0304254 A1* | 10/2014 | Rubinstein | H04L 67/22 707/722 |
| 2015/0200832 A1* | 7/2015 | Kurniady | G06Q 10/101 709/224 |

* cited by examiner

SYSTEM AND METHOD FOR IDENTIFICATION AND CONSOLIDATION OF RELATED CONCURRENT DOCUMENT SESSIONS

CROSS REFERENCE TO RELATED APPLICATIONS

The instant application is a continuation of U.S. application Ser. No. 14/315,277 filed Jun. 25, 2014, the disclosure of which is incorporated herein by reference in its entirety.

BACKGROUND

Personal computers traditionally use only directly accessible resources to execute programs and store files. But as network access has become more widespread, it has become feasible to execute programs and store files using remote resources. The use of remote resources, commonly referred to as cloud computing, can allow a user to access a file or an application using any device that can access a network. Cloud computing may allow a user to establish an editing session for a computer file stored on a remote server, in which the user may access and edit the file located on the server rather than editing the file on one device and then propagating the edited file to other devices. Cloud computing can thereby reduce the user's need for local computer resources and assure the user that, regardless of which device is available, the user will be able to access an up-to-date version of a desired file or application. Cloud computing can also allow multiple users to join such an editing session, allowing even geographically dispersed users to collaborate on a computer file in real time.

Collaboration features of modern cloud computing systems are only useful when a user recognizes an opportunity to collaborate with other users on a file. Users must know a collaborator before they can provide file access to the collaborator, and must realize that the other collaborator is interested in working on such a file before they will provide such access. Document processors currently in use, whether provided by a cloud computing system or not, cannot identify possible collaborators and suggest that they join the same editing session.

Therefore there is a need for cloud computing systems which can efficiently find collaborators.

SUMMARY

Thus there exists a need in the art to identify users of a cloud computing system as possible collaborators on a file. It is a realization of the inventors that potential collaborators may be identified based on both the similarities between users in different editing sessions and on the similarities between the files of the different editing sessions. The systems and methods described herein therefore identify when users in different editing sessions have similar characteristics and are editing files with similar subject matter, and inform the users of the opportunity to collaborate.

In certain aspects, the systems and methods described herein relate to identifying users that may be interested in collaborating on a file. A collaboration engine may be configured to be accessible to a remote client computing device, and may include a document processor in communication with a resource database and a user database. The resource database may store computer files and information regarding the stored computer files, and the user database may store information regarding users and the files users are authorized to access. The document processor may identify a first editing session associated with a first file and a second editing session associated with a second file. The second file may be related to the first file. The document processor may determine whether a second user associated with the second file is authorized to access the first file, and, in response to determining that the second user is authorized to access the first file, grant the second user access to the first editing session. The document processor may further add the second user to the first editing session. In some implementations, the document processor may copy content of the second file into the first file. In some such implementations, the document processor may identify content of the second file related to content of the first file, and the content of the second file copied into the first file may be the identified related content.

The first file may be related to the second file based on metadata of the content (such as a filename of the first file and a filename of the second file); first content of the first file and second content of the second file; a first link in the first file and a second link in the second file; an association between a first user associated with the first file and the second user associated with the second file; or on some other suitable basis. In implementations in which the first and second files are related based on the first and second content, the first file may be related to the second file based on a first plurality of topics, entities, or other suitable nouns or phrases in the first content and a second plurality of topics, entities, or other suitable nouns or phrases in the second content. In some implementations in which the first file is related to the second file based on an association between the first user and the second user, the first user may be associated with the second user based on one or more of proximity between the first and the second users, a calendar event, an email, a social network connection, or a previous collaboration between the first user and the second user. In some implementations in which users are associated based on a previous collaboration, the first user may be associated with the second user if the first user has spent at least a threshold amount of time in a third editing session associated with a third file and the second user has spent at least the threshold amount of time in a fourth editing session associated with the third file. In some such implementations, the third editing session is the fourth editing session.

BRIEF DESCRIPTION OF THE DRAWINGS

The systems and methods described herein are set forth in the appended claims. However, for the purpose of explanation, several embodiments are set forth in the following drawings.

DETAILED DESCRIPTION

In the following description, numerous details are set forth for the purpose of explanation. However, one of ordinary skill in the art will realize that the implementations described herein may be practiced without the use of these specific details and that the implementations described herein may be modified, supplemented, or otherwise altered without departing from the scope of the systems and methods described herein.

The systems and methods described herein relate to identifying opportunities for users to collaborate on a file. A collaboration engine may be configured to determine when two or more files are related to similar subject matter and are associated with similar users. When such files are identified, the collaboration engine may identify one of the files as a primary file, and request permission from a user associated with the primary file to invite the other users to collaborate on the primary file. The other users may agree, and thereby take share insights and efforts with all users who agree to collaborate on the primary file.

Figure 1:
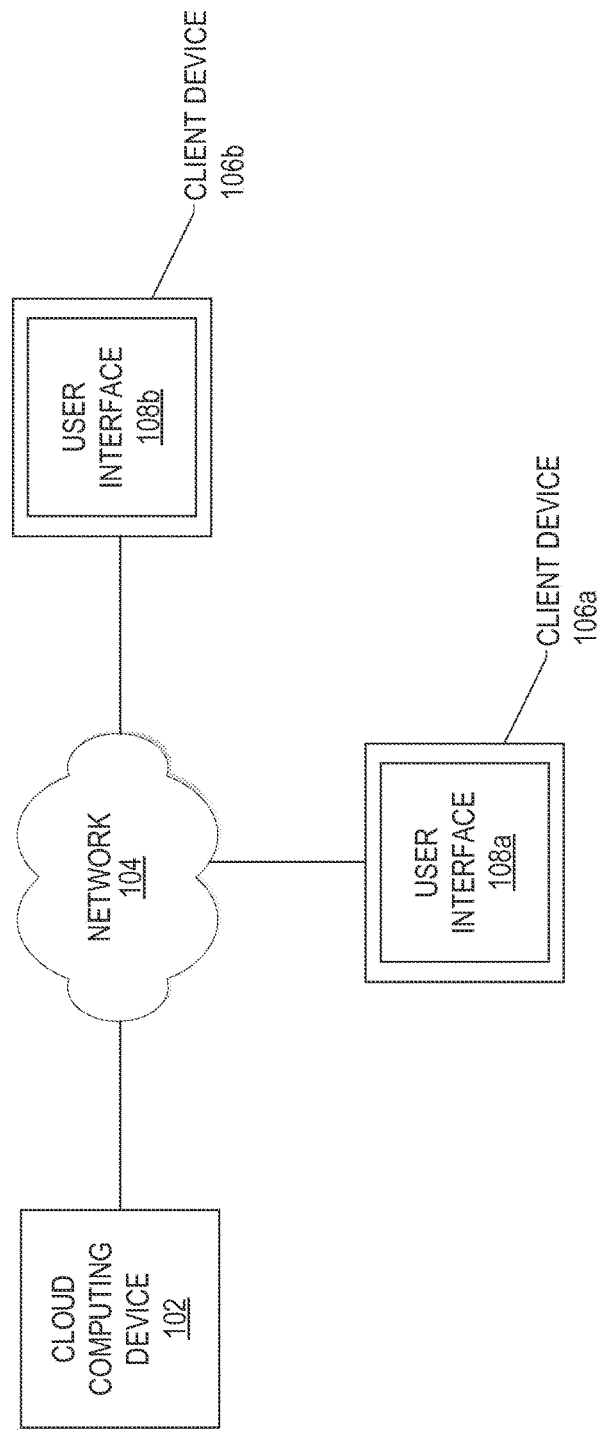
FIG. 1 is a block diagram of a collaborative document editing system, according to an illustrative implementation.

FIG. 1 is an illustrative block diagram of a collaborative document editing system 100, which allows users to remotely store and alter computer files and may identify users for collaboration in editing a computer file. Computer files may include text, images, audio files, video files, presentation files, spreadsheets, binary data files, computer instructions, HTML files, or other suitable files. Files are stored on cloud computing device 102, which may include a server, a personal computer, a mainframe, a cluster of computing devices, or some other suitable computing device, and is described in more detail in relation to FIG. 2. Files may be uploaded to or accessed from cloud computing device 102 via network 104. Network 104 is a computer network, and in certain implementations may be the Internet. One or more users may access services provided by cloud computing device 102 through client devices 106a and 106b (collectively, client devices 106) with respective user interfaces (UIs) 108a and 108b (collectively, UIs 108). A UI 108 may be generated by its corresponding client device 106 based in whole or in part on instructions sent by cloud computing device 102. Users may begin or enter an editing session by selecting a file in UI 108, and cloud computing device 102 may identify similar editing sessions based on the content of the files, similarities between users, or other suitable information. Cloud computing device 102 may then generate suggestions that users in similar editing sessions collaborate on a single computer file.

A client device 106 is a computing device that may provide an interface between a user and cloud computing device 102, allowing a user to generate, access, and edit computer files on cloud computing device 102. A client device 106 may be a personal laptop computer, a personal desktop computer, a tablet computer, a smartphone, or some other computing device capable of accessing and editing files stored on cloud computing device 102. In certain implementations, client device 106 may be associated with a collaboration account on cloud computing device 102. In such implementations, client device 106 may provide information identifying itself to cloud computing device 102 upon first connecting to cloud computing device 102, and cloud computing device 102 may provide a service to client device 106 upon verifying the identity of client device 106. Although two client devices 106 are depicted for simplicity, multiple users may access cloud computing device 102 using one or more client devices 106.

UI 108 is an interface through which a user may access files and applications associated with cloud computing device 102, and may include a computer program such as a web browser, a word processor, or some other suitable program. A program included in UI 108 may be installed on and executed by UI 108, or may be an online web-based application stored in whole or in part on a remote server and accessed remotely. As an illustrative example, UI 108 may include an Internet browser that executes an online web-based word processing application according to instructions received from cloud computing device 102. UI 108 may generate and send commands to cloud computing device 102 in response to a predetermined action by a user, which may include selecting an icon with a cursor or on a touchscreen, selecting a menu option with a cursor or on a touchscreen, writing a text command, or other suitable action. Commands may include requests to generate a file with an application, requests to edit a file, requests to copy the content of one file to a related file, and other suitable commands.

Cloud computing system 100 allows a user to edit a computer file in an editing session established through a UI 108 provided on a corresponding client device 106, and may suggest collaborators based on similarities between such editing sessions. A client device 106 connects to cloud computing device 102 through network 104. A UI 108 displays information provided by cloud computing device 102, such as a list of files associated with the user. A user may interact with UI 108 to generate or request access to a file, such as by selecting an icon with a cursor. Cloud computing device 102 may identify when two or more different users are or were in similar editing sessions based on similarities between the users and the content of the respective files. Cloud computing device 102 may present such identified users with the opportunity to collaborate on a single file.

Figure 2:
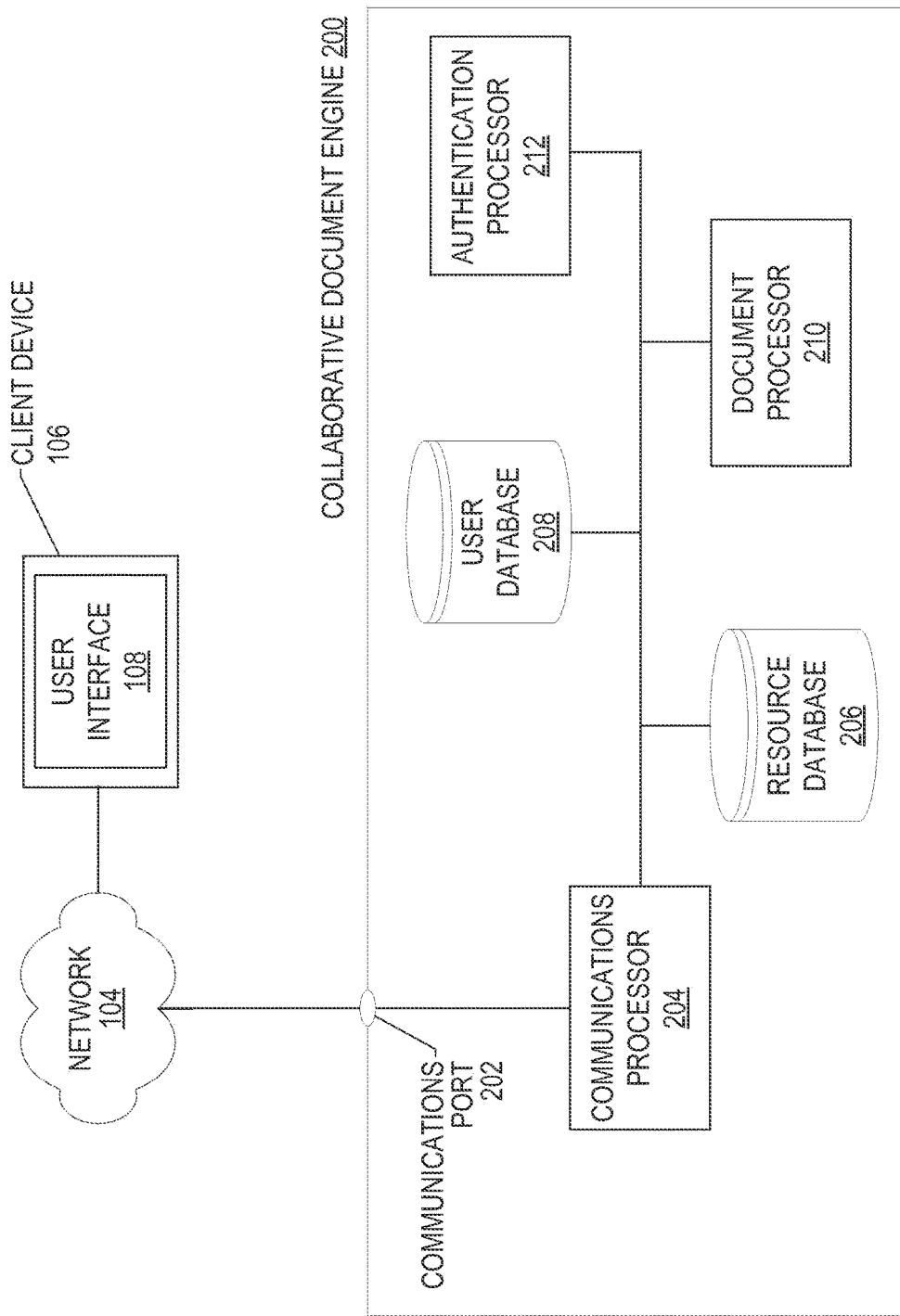
FIG. 2 is a block diagram of a cloud computing engine, according to an illustrative implementation.

FIG. 2 is an illustrative block diagram of a collaboration engine 200, which may act as the cloud computing device 102 of FIG. 1. Collaboration engine 200 allows a client device 106 to access services over network 104. Collaboration engine 200 transmits and receives data through communication port 202. Communication processor 204 identifies user instructions received through communication port 202 and transmits information to the client device 106 based on the received instructions. Files are stored in resource database 206 and user information is stored in user database 208. Document processor 210 modifies information stored in resource database 206 based on user instructions, and may identify potential collaborators on a file based on information stored in resource database 206 and user database 208. Authentication processor 212 may verify the identity of a user, whether a client device 106 is authorized to access a service provided by collaboration engine 200, whether an application is authorized to access a file associated with collaboration engine 200, or other suitable information.

The depicted communication port 202 is a network port which receives user commands via network 104 and transmits information and file contents sent by collaboration engine 200. Communication port 202 may include a 100BASE-TX port, a 1000BASE-T port, a 10GBASE-T port, a Wi-Fi antenna, a cellular antenna, or other suitable network ports. In certain implementations, there may be a different number of ports than are depicted. In certain implementations, communication port 202 may provide secure communications, such as by using the Secure Sockets Layer (SSL) protocol, the Transport Layer Security (TLS) protocol, or other suitable protocol.

Communication processor 204 may be a computer processor that identifies instructions received through communication port 202 and transmits information to a client device 106 in response. Upon a client device 106 connecting to collaboration engine 200, communication processor 204 may identify a user account that the client device 106 is attempting to access, in certain implementations by comparing login information provided by the user to information stored in user database 208. Communication processor 204 may further identify the client device 106 from packet headers identifying the source of data received from the user, by querying the client device 106, from information provided by the client device 106 at login, or through some other suitable method of identifying the user device. In some implementations, communication processor 204 may identify the user's location. As illustrative examples of such implementations, communication processor 204 may identify a location of a client device 106 based on location information transmitted by the client device 106 or based on packet headers identifying a local network that the client device 106 is connected to. Communication processor 204 may also provide a cloud computing service to a user by transmitting instructions for executing an application, the output of an application, file information associated with a user account, or other suitable information.

Resource database 206 may be a computer-readable and -writable medium storing at least one file associated with a cloud computing system 100, which may include text, images, audio files, video files, spreadsheets, presentation files, HTML files, calendar files, emails, or other suitable computer files. Resource database 206 may also store metadata associated with each file, which may include a MIME type of the file, users authorized to access the file, a document signature, characteristics of users that may be invited to collaborate on the file, or other suitable information. A document signature represents the content of a file, and may be based on one or more of the title, section titles, chapter titles, key words or phrases identified using natural language processing (NLP) or other suitable techniques, document topics identified by natural language processing or other suitable techniques, links contained within the file, the content of files linked to by the file, the names or captions of images in the file, image analysis of images in the file, the location in which a photo in the file was taken, information regarding which users have previously accessed or edited the file, or other suitable information. Characteristics of users that may be invited to collaborate on the file may be based on user preferences, and may include proximity to a user associated with the file, connection to a predetermined computer network, inclusion in the same calendar event as a user authorized to access the file, membership in an organization, the domain name of an email address associated with a user, social network connections with a user authorized to access the file, or some other suitable characteristics. As illustrative examples of such characteristics, a user may choose to allow collaboration engine 200 to invite other users to collaborate on a file if the other users are in the same area, have the same email address domain, have calendars indicating that they are attending the same meeting, are linked to the user on a social network website, or have previously received emails from the user. In some implementations, a portion of resource database 206 may be accessed through a remote network, and may be a third-party database.

User database 208 may be a computer-readable and -writable medium storing information associated with at least one user of collaboration engine 200. Information associated with a user may include one or more of a username and password associated with the user, a list of the files associated with the user, a list of client devices 106 associated with the user, a list of applications associated with the user, a list of each application the user has authorized to access each file or file type represented in the user's files, a default application the user has identified for accessing a file type, a location from which the user is accessing collaboration engine 200, user preferences, and other suitable user information. User preferences may include whether the user is willing to collaborate with other users regarding a file or a set of files, which users the user is willing to collaborate with, the characteristics of users the user is willing to collaborate with, or other suitable preferences. In some implementations, user database 208 may store information regarding a user's accounts with other cloud computing or network services, such as email or social networking accounts. As an illustrative example of such an implementation, user database 208 may store information allowing collaboration engine 200 to determine whether two users have emailed each other regarding a meeting. In some implementations, user database 208 and resource database 206 may be combined in a single database. As an illustrative example of such an implementation, a single database may store information identifying user accounts as well as files associated with the user accounts.

Document processor 210 may be a computer processor that generates or alters resources in resource database 206 based on user instructions, and that identifies potential collaborators on a file. Document processor 210 may generate new resources in resource database 206 in response to a user instruction to do so, and may alter the contents or the metadata of a computer file in resource database 206 based on instructions received from a user associated with the file. Document processor 210 may generate or modify document signatures in resource database 206 in response to a predetermined event or on a periodic basis. As an illustrative example of the former, a document signature may be updated whenever document processor 210 records a user's change to a file in resource database 206; as an illustrative example of the latter, a document signature may be updated once per day, per half-hour of an editing session involving the file, or per some other period. Document processor 210 may also compare editing sessions based on the files and users associated with each respective editing session. As described in relation to FIG. 3, document processor 210 may calculate document similarity scores based on similarities between files, user similarity scores based on user characteristics, and session similarity scores as a function of document and user similarity scores. As is further described in relation to FIG. 3, document processor 210 may transmit messages via communication processor 204 to suggest collaboration between users based on session similarity scores, and may combine files associated with different editing sessions if the users agree to collaborate.

Authentication processor 212 may be a computer processor that blocks unauthorized access of information associated with collaboration engine 200. Unauthorized access may be detected by comparing one or more of a username and password combination, information identifying a client device 106, geographic information associated with the client device 106, or other suitable information received from a client device 106 with information stored in user database 208. If a request generator is not successfully verified, authentication processor 212 may transmit a message to the user or a system administrator, block client device 106, temporarily lock the user account, or take some other predetermined action. In certain implementations, if a client device 106 has not previously been connected to collaboration engine 200, authentication processor 212 may require the user to provide identification information, which may include a username and password combination, an identification number provided to the user by a voice or text message sent to a telephone number previously provided by the user, or other predetermined identification information. In certain implementations, authentication processor 212 may verify that an application may be allowed to access a file by searching resource database 206 and user database 208 to determine whether the application is associated with the user, whether the application is associated with the file type of the file, whether the user has authorized the application to access the file or the file type, or other suitable verification information. In some such implementations, authentication processor 212 may verify a security token provided by the application against information stored in one or both of resource database 206 and user database 208. If an application is not authorized to access a file, authentication processor 212 may prevent the application from accessing the file, transmit a message to the user or a system administrator, or take some other suitable action. In certain implementations, such a message to the user may ask if the user wishes to authorize the application to access the file. In certain implementations, authentication processor 212 may establish a secure connection with client device 106 using a protocol such as the SSL or TLS protocols.

Collaboration engine 200 receives transmissions from client device 106 at communication port 202 via network 104. Authentication processor 212 may compare information provided by a client device 106 with information stored in user database 208 to verify that a user is authorized to enter an editing session or otherwise access a cloud computing account. Communication processor 204 may identify the cloud computing account upon receiving a connection request from a client device 106. Communication processor 204 may route information between a client device 106 and document processor 210 as part of an editing session. Document processor 210 may generate, alter, or delete a file or metadata associated with a file in resource database 206 based on user commands received via communication processor 204 or on the output of applications associated with a user account. Document processor 210 may further identify similar editing sessions based on similarities between the respective files, the respective users, or both the files and the users, and may suggest that the users associated with similar editing sessions collaborate on a single file. In some implementations, if users accept such a collaboration suggestion, document processor 210 inserts content of a file associated with one editing session into the file associated with another editing session.

Figure 3:
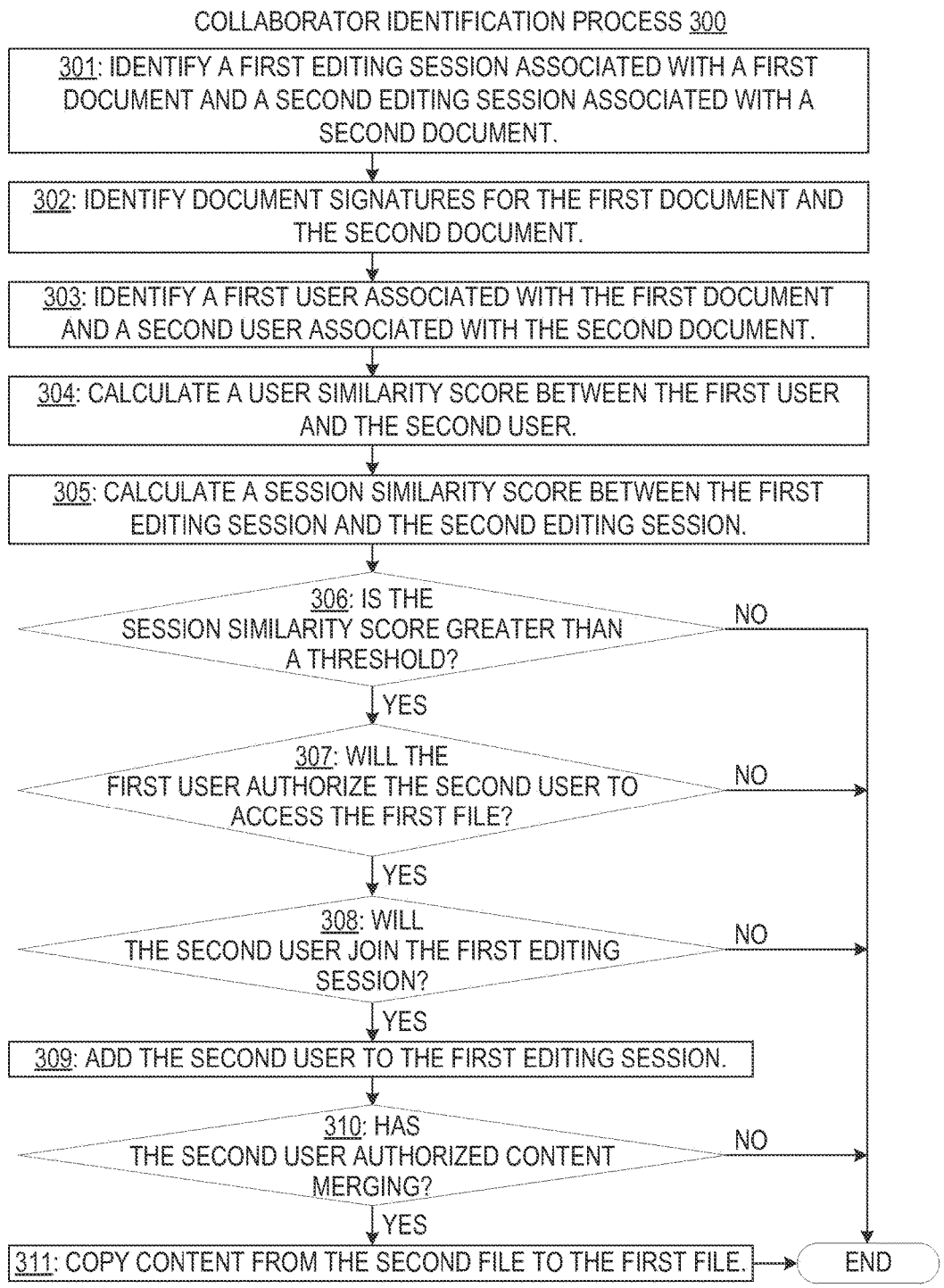
FIG. 3 is a flow chart of a process for identifying opportunities for collaboration on a file and inviting users to collaborate on the file, according to an illustrative implementation.

FIG. 3 is an illustrative flow chart of a collaborator identification process 300. Referring to FIG. 2, collaborator identification process 300 invites users associated with similar editing sessions to collaborate on a single file. For simplicity, FIG. 3 only refers to a first and a second editing session, but in some implementations process 300 may be applied simultaneously to a larger number of editing sessions. Collaborator identification process 300 begins with step 301, in which document processor 210 identifies a first editing session for a first file and a second editing session for a second file. Then, in step 302, document processor 210 identifies document signatures for the first and second files. Step 302 may consist of retrieving previously generated document signatures from resource database 206, or in freshly generating respective document signatures for the first and second files. In step 303, document processor 210 identifies a first user associated with the first file and a second user associated with the second file, which may be based on the users respectively associated with the first and the second editing sessions, the users who respectively generated the first and second files, users who are respectively authorized to edit the first and second files, or on some other suitable basis. In some implementations, more than one user may be identified for one or more of the files associated with the identified editing sessions. In some implementations, users may be identified even if they are not participating in an editing session when document processor 210 carries out step 303.

In step 304, document processor 210 calculates user similarity scores between the users identified in step 303. A user similarity score between two users may be a function of one or more of the number of files the two users have collaborated on in the past, the amount of time the two users have spent in editing sessions associated with files that both users were authorized to edit, the amount of time the two users have spent in the same editing session, overlap between the document signatures of files associated with the first user and files associated with the second user, how frequently the users have sent emails to each other in the past, how closely connected the users are on a social networking website, or some other suitable metric. In implementations in which more than one user per file was identified in step 303, document processor 210 may identify pairwise user similarity scores between each user associated with the first file and each user associated with the second file, and calculate an overall user similarity score as an average of the pairwise user similarity scores. In some such implementations, the overall user similarity score may be a weighted average, and weightings may depend on how long each user has spent in an editing session associated with the file, how much content each user has added to the file, or on other suitable metrics. In some implementations, document processor 210 may calculate user similarity scores between users on a periodic basis (such as once per hour, once per day, or on some other suitable period) or in response to a predetermined event (such as a user entering or leaving a file editing session) and store them in user database 208; in such implementations, step 304 may consist of retrieving a previously calculated user similarity score.

In step 305, document processor 210 calculates a session similarity score between the first editing session and the second editing session based on the document signatures of the first file and the second file and based on the user similarity score calculated in step 304. A session similarity score may be an average of the user similarity score and a document similarity score based on the document signatures. Such an average may be weighted by a confidence measure in each score, which may be set by a system administrator, calculated based on historical data about how accurate components of the respective scores have been in predicting whether users will agree to collaborate, calculated based on the amount of data used to calculate the respective scores, or determined in some other suitable fashion. The document similarity score may be a function of the number of topics or phrases present in both the document signature of the first file and the document signature of the second file, the number of topics and phrases that are in one document signature but not the other, the amount of content regarding a shared topic in each of the two files, the number of unusual topics or phrases shared by both document signatures, or based on some other suitable feature of the document signatures. As an illustrative example, consider a document that includes a sentence about baseball but mostly includes content related to soccer. Such a document will likely have a low or zero document similarity score with a document dedicated entirely to boxing; will have a somewhat higher document similarity score with a document dedicated entirely to the World Series; and will have a still higher document similarity score with a document dedicated entirely to the World Cup.

In step 306, document processor 210 determines whether the session similarity score calculated in step 305 is greater than a threshold. Such a threshold may be a predetermined cutoff, or may be calculated based on pairwise session similarity scores for all editing sessions throughout the system. In the latter case, the threshold may be identified based on the k-means clustering algorithm, an agglomerative hierarchical clustering algorithm, or some other suitable algorithm. If the session similarity score is below the threshold, the two sessions may be considered too different to warrant suggesting collaboration, and process 300 ends. Otherwise, document processor 210 may suggest collaboration.

In step 307, document processor 210 determines whether the first user will authorize the second user to access the first file: if not, process 300 ends. Step 307 may be implemented by some combination of comparing the first user's user preferences stored in file database 206 and user database 208 with characteristics of the second user, by generating a message to the first user asking for the user's permission, or by some other suitable method. As an illustrative example of comparing preferences with characteristics, the first user may indicate that anyone who is a member of the first user's school may automatically be invited to collaborate on the first file, but that no one else should be informed of its existence; as an illustrative example of requesting permission, the first user may indicate that collaboration engine 200 should identify each potential collaborator to the first user and request permission to invite her to collaborate on the file. In some implementations, if a user has indicated that only some or no users are to be invited to collaborate on a file, step 307 may precede step 304.

In step 308, document processor 210 determines whether the second user will join the first editing session; if not, process 300 ends. Like step 307, step 308 may be implemented by sending the second user (via communication processor 204) an invitation to join the first editing session, by consulting the second user's user preferences, or based on some other suitable method. As described, if the first and the second user are both willing to collaborate, the second user will begin accessing the first file: it is assumed for simplicity that the first file is the primary file. A primary file in a group of related editing sessions has some combination of more content, more collaborators at the time that process 300 is being implemented, more users authorized to edit the file, a higher rate of new content being added, or otherwise meets a predetermined metric indicating that it is the primary file. If the second file were to meet the criteria for being the primary file, the numbers may simply be reversed: the first user would join the second editing session, and so on. In implementations in which more than two editing sessions are considered as candidates for combination, a single primary file may be identified and all users associated with related editing sessions may be invited to join the editing session associated with the primary file.

For simplicity, step 307 is depicted as occurring before step 308, but in some implementations the two may occur in a different order or in parallel. As an illustrative example of such an implementation, the second user may identify a group of users that are not to be invited to collaborate on the second file, and the first user may both require permission before inviting other users to collaborate and be a part of the group of users identified by the second user. In such an example, process 300 may end before sending an invitation in step 307, thereby avoiding informing the first user that the second user is associated with a file having content similar to that of the first file.

If the first and the second users have proven willing to collaborate in steps 307 and 308, process 300 continues to step 309, in which document processor 210 records that the second user has access to the first file and adds the second user to the first editing session. Once process 300 has added the second user to the first editing session, process 300 may end with content merging. In step 310, document processor 210 determines whether the second user has authorized document processor 210 to combine the files. If not, process 300 may end; if so, then, in step 311, document processor 210 may identify and copy content from the second file to the first file. Step 311 may include identifying content of the second file that is not included in the first file, calculating similarity scores between the first file and portions of the second file and copying those portions with a similarity score above a predetermined or calculated threshold, or other suitable means of identifying content to copy from the second file to the first file. In some implementations, the second user may manually add content from the second file to the first after process 300 has been completed. As illustrative examples of such implementations, the second user may request document processor 210 to copy the entire content of the second file into the first file or may request document processor 210 to suggest content to copy from the second file to the first file. As another illustrative example of such an implementation, document processor 210 may generate instructions to UI 108 to show the second user both the first and the second files on a split screen (such as is depicted in FIG. 5), allowing the second user to specify both content to copy from the second file and the location in the first file to copy such content into.

In some implementations, process 300 may occur in response to a predetermined event, such as a user editing a file, or may occur on a periodic basis, such as once every half-hour that an editing session has been in existence. In some implementations, process 300 may be repeated for two files that failed one of steps 306-308 in response to a predetermined change, such as a change in the user similarity scores, a change in user preferences regarding who may be invited to collaborate on a file, or some other suitable change.

Figure 4:
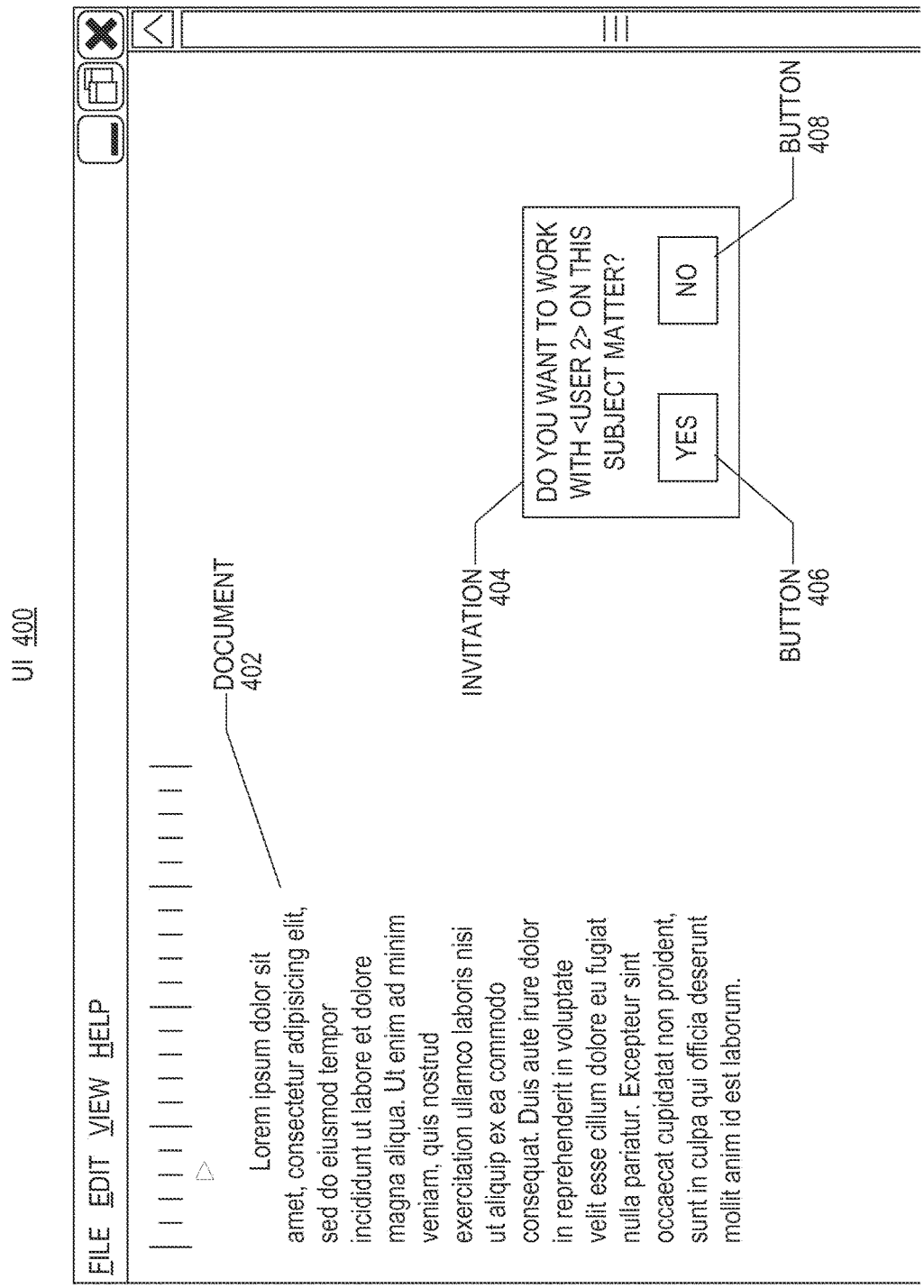
FIG. 4 depicts an exemplary screenshot of a user interface for inviting a user to collaborate with another user on a document, according to an illustrative implementation.

FIG. 4 depicts an exemplary screenshot of a UI 400 in which a user is being invited to collaborate on a file. Referring to FIG. 3, UI 400 may represent an element of step 307 or 308 in determining whether the user wishes to collaborate on a file. UI 400 may be UI 108 of FIG. 1. As depicted, the user presented with UI 400 is in an editing session featuring document 402, and has received invitation 404 suggesting that the user may be interested in collaborating with a second user. In some implementations, invitation 404 may list more than one other user, may specify which subject matter is in the other editing session, or otherwise provide further information to the user. As depicted, invitation 404 includes buttons 406 and 408. If the user selects button 406, the user may be joined in an editing session with the second user if the second user also agrees to collaborate; if the user selects button 408, the user will not be joined in an editing session with the other user, and in some implementations processor 210 may revise the model used to calculate the user's similarity score or the session similarity scores accordingly. In some implementations, UI 400 may remove invitation 404 if the user has not selected button 406 within a predetermined period of time.

Figure 5:
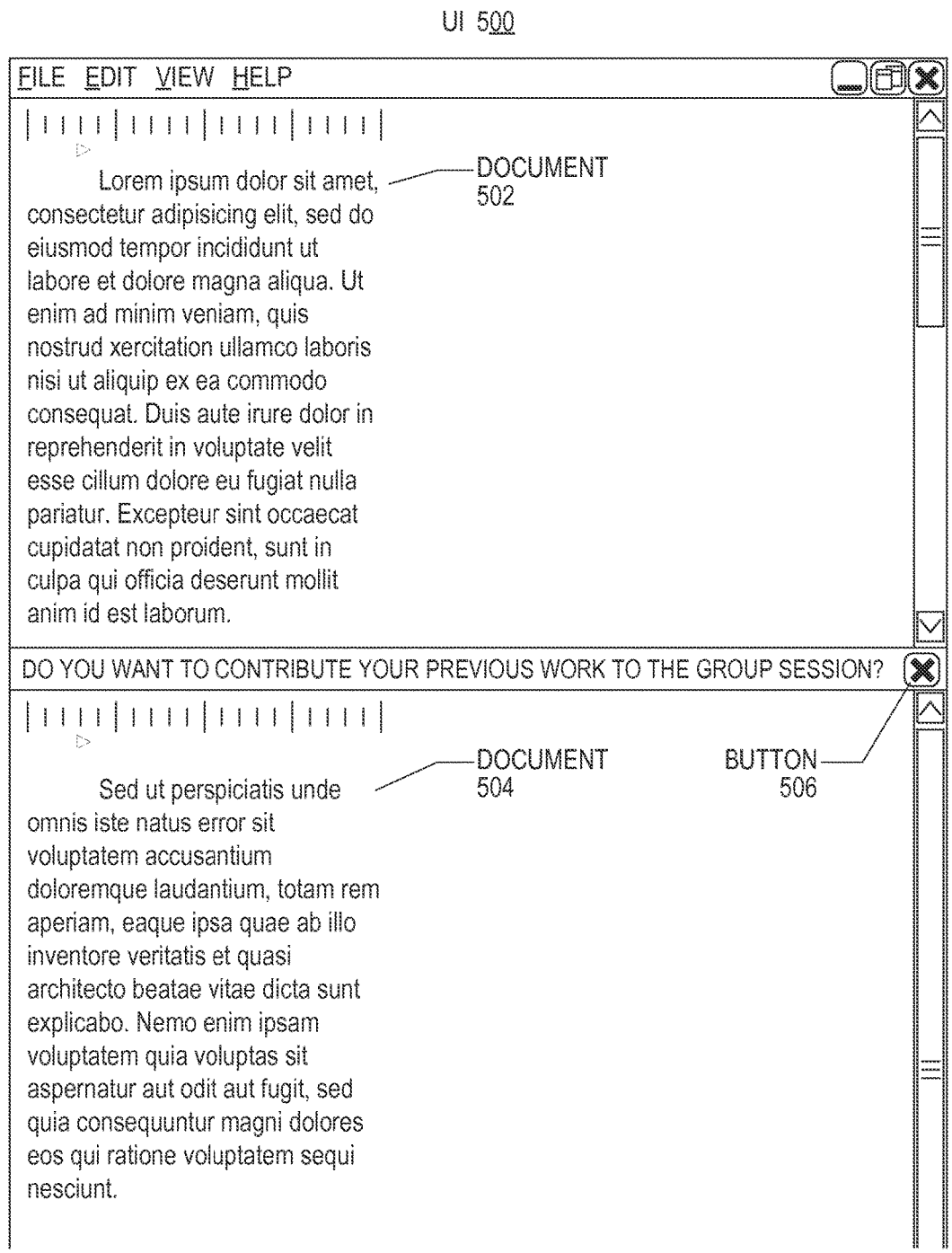
FIG. 5 depicts an exemplary screenshot of a user interface allowing a user to copy content of a document into an editing session that the user has been invited into, according to an illustrative implementation.

FIG. 5 depicts an exemplary screenshot of a UI 500 in which a user has joined another editing session. UI 500 may be UI 108 of FIG. 1. As depicted, UI 500 displays both document 502 and document 504. Document 502 is the document of the editing session that the user has joined; document 504 is the user's document. Referring to FIG. 3, UI 500 may be displayed if the user agrees to collaborate on a document and chooses to manually combine the content of document 504 into document 502. Once the user is satisfied that they are finished with document 504, they may select button 506 to enter into a single-screen view of the editing session with document 502.

Figure 6:
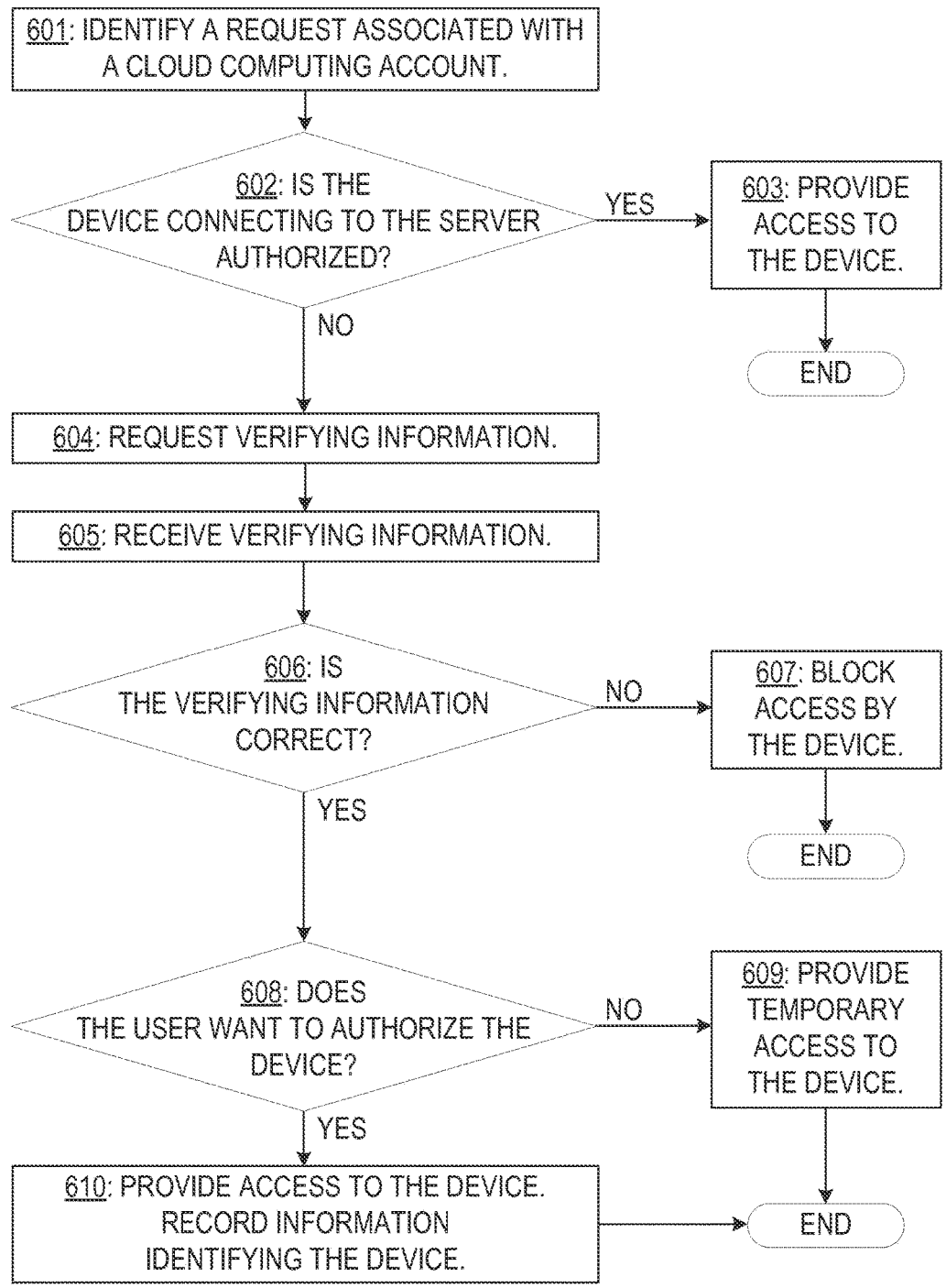
FIG. 6 is a flow chart of a process for verifying the identity of a user of the cloud computing system, according to an illustrative implementation.

FIG. 6 is an illustrative flow chart of a user verification process 600. Referring to FIG. 2, user verification process 600 verifies that a request generator is authorized to access information associated with collaboration engine 200. User verification process 600 begins with step 601, in which communication processor 204 identifies a request from a client device 106 associated with a cloud computing account, such as a login request or a request for information associated with the account. In step 602, authentication processor 212 determines whether the client device 106 has been authorized to access information associated with the cloud computing account based on information regarding the request. Information regarding the request may include information regarding the source of the request, such as an Internet Protocol (IP) address from which the request was received, and information included within the request, such as user login information. Authentication processor 212 may determine whether such information matches information stored in user database 208 to determine whether client device 106 has been authorized to access the requested cloud computing account. In certain implementations, authentication processor 212 may examine other data before allowing the client device 106 to access the authorizing user's data. In such implementations, authentication processor 212 may compare information stored in user database 208 with Global Positioning System (GPS) data from the client device 106, IP routing data, or other data associated with the client device 106, and may proceed to step 607 in the case of a mismatch. As an illustrative example of such implementations, if a first client device 106 is accessing data associated with a user account, and a second client device 106 in a different geographic location attempts to access data associated with the same user account, authentication processor 212 may block the second client device 106 from accessing the collaboration engine 200. In certain implementations, a first client device 106 may be authorized to access a different set of the same user's files as a second client device 106. As an illustrative example of such an implementation, a user may authorize a mobile computing device to access files associated with the user but not sensitive financial files associated with the user's account.

If step 602 confirms that the client device 106 is authorized, authentication processor 212 may allow the client device 106 to access the authorizing user's data in step 603. If the client device 106 is not authorized, user verification process 600 may proceed to step 604. In step 604, authentication processor 212 may, via communication processor 204, request that client device 106 provide information verifying that it is authorized to access the user account. Such information may include a user ID and password combination, a personal identification number (PIN), an automatically generated identification number transmitted to a phone number provided by the user, or other suitable identifying information. Communication processor 204, upon receiving the verifying information in step 605, passes the information to authentication processor 212. In step 606, authentication processor 212 may compare the verifying information to information stored in user database 208 to determine whether the verifying information is correct. If the verifying information is incorrect, authentication processor 212 may instruct communication processor 204 to block access by the device in step 607, and may temporarily block access to the account, alert the user or a systems administrator, or take other suitable action.

If the user identification is correct, step 608 may determine whether the user wants to authorize the client device 106, which may be determined by identifying whether the user selected a "Remember this device" option in providing identification information, by transmitting a prompt to the user to select whether to permanently authorize the client device 106, or by some other suitable method. If not, the authentication processor 212 provides the client device 106 with temporary access in step 609. Otherwise, in step 610 the authentication processor 212 provides the client device 106 with access to collaboration engine 200 and records information identifying the device in user database 208.

Figure 7:
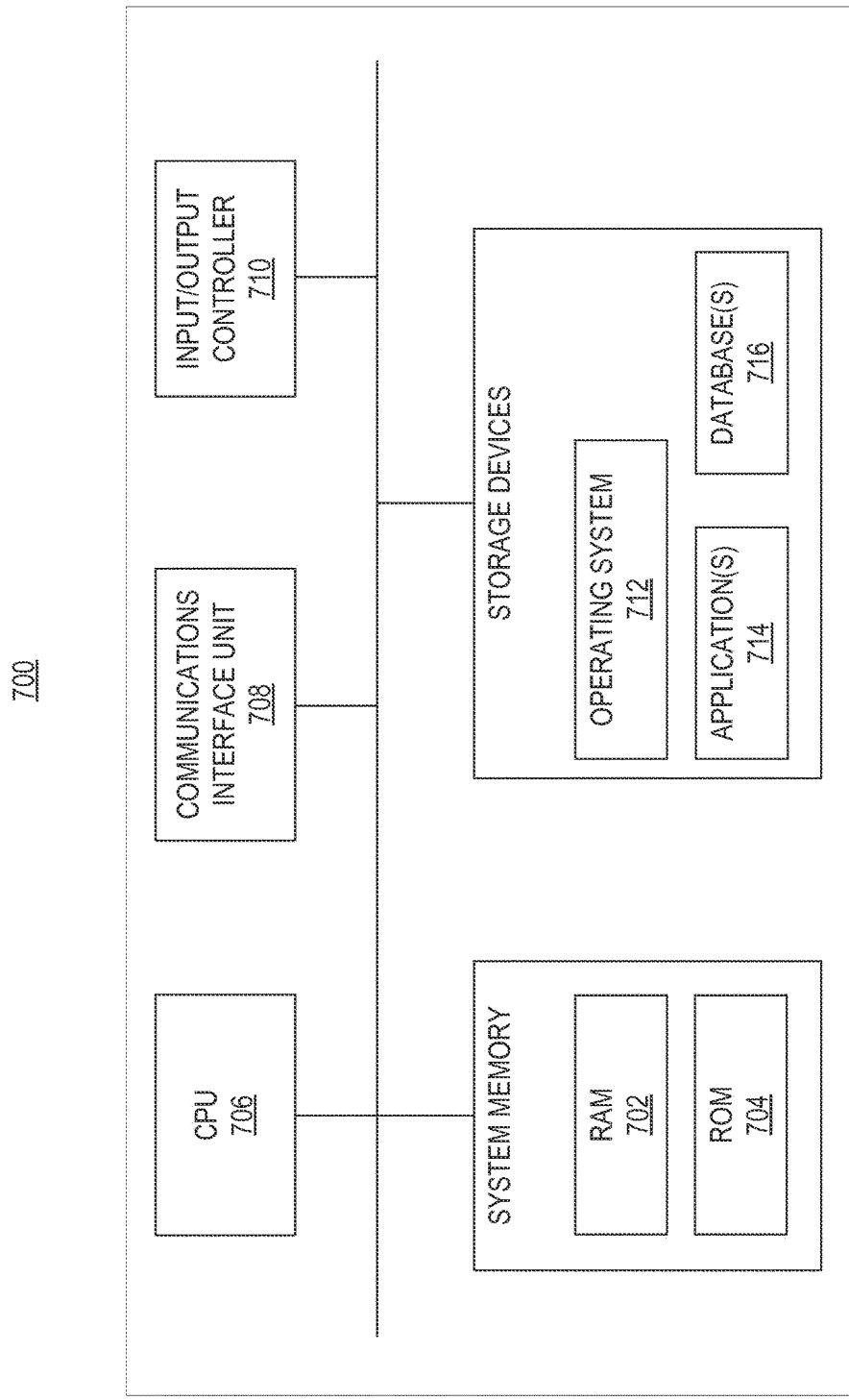
FIG. 7 is a block diagram of a computing device for performing any of the processes described herein, according to an illustrative implementation.

FIG. 7 is a block diagram of a computing device that can be used to implement or support any of the components of the system of FIG. 1 or 2, and for performing any of the processes described herein. Document collaboration engine 200 may be implemented on one or more computing devices 700 having suitable circuitry, and clients 114, 124, and 144 and third-party server system 134 may communicate with server system 104 through one or more computing devices 700 having suitable circuitry. In certain aspects, a plurality of the components of document collaboration system 100 may be included within one computing device 700. In certain implementations, a component and a storage device may be implemented across several computing devices 700.

The computing device 700 comprises at least one communications interface unit 708, an input/output controller 710, system memory, and one or more data storage devices. This can support a network connection such as a connection to network 104 in FIG. 1. The system memory includes at least one random access memory (RAM 702) and at least one read-only memory (ROM 704). RAM 702 can support the resource database 206 of FIG. 2, for example. All of these elements are in communication with a central processing unit (CPU 706) to facilitate the operation of the computing device 700. The computing device 700 may be configured in many different ways. For example, the computing device 700 may be a conventional standalone computer or alternatively, the functions of computing device 700 may be distributed across multiple computer systems and architectures. In FIG. 7, the computing device 700 may be linked, via network or local network, to other servers or systems.

The computing device 700 may be configured in a distributed architecture, wherein databases and processors are housed in separate units or locations. Some units perform primary processing functions and contain, at a minimum, a general controller or a processor and a system memory. In distributed architecture implementations, each of these units may be attached via the communications interface unit 708 to a communications hub or port (not shown) that serves as a primary communication link with other servers, client or user computers, and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM, and TCP/IP.

The CPU 706 comprises a processor, such as one or more conventional microprocessors and one or more supplementary co-processors such as math co-processors for offloading workload from the CPU 706. The CPU 706 is in communication with the communications interface unit 708 and the input/output controller 710, through which the CPU 706 communicates with other devices such as other servers, user terminals, or devices. The communications interface unit 708 and the input/output controller 710 may include multiple communication channels for simultaneous communication with, for example, other processors, servers, or client terminals.

The CPU 706 is also in communication with the data storage device. The data storage device may comprise an appropriate combination of magnetic, optical, or semiconductor memory, and may include, for example, RAM 702, ROM 704, flash drive, an optical disc such as a compact disc, or a hard disk or drive. The CPU 706 and the data storage device each may be, for example, located entirely within a single computer or other computing device; or connected to each other by a communication medium, such as a USB port, serial port cable, a coaxial cable, an Ethernet cable, a telephone line, a radio frequency transceiver, or other similar wireless or wired medium or combination of the foregoing. For example, the CPU 706 may be connected to the data storage device via the communications interface unit 708. The CPU 706 may be configured to perform one or more particular processing functions.

The data storage device may store, for example, (i) an operating system 712 for the computing device 700; (ii) one or more applications 714 (e.g., computer program code or a computer program product) adapted to direct the CPU 706 in accordance with the systems and methods described here, and particularly in accordance with the processes described in detail with regard to the CPU 706; or (iii) database(s) 716 adapted to store information that may be utilized to store information required by the program. The depicted database 716 can be any suitable database system, and can be a local or distributed database system.

The operating system 712 and applications 714 may be stored, for example, in a compressed, an uncompiled and an encrypted format, and may include computer program code. The instructions of the program may be read into a main memory of the processor from a computer-readable medium other than the data storage device, such as from the ROM 704 or from the RAM 702, or from a computer data signal embodied in a carrier wave, such as that found within the well-known Web pages transferred among devices connected to the Internet. While execution of sequences of instructions in the program causes the CPU 706 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation to document collaboration as described herein. The program also may include program elements such as an operating system 712, a database management system, and "device drivers" that allow the processor to interface with computer peripheral devices (e.g., a video display, a keyboard, a computer mouse, etc.) via the input/output controller 710.

The term "computer-readable medium" as used herein refers to any non-transitory medium that provides or participates in providing instructions to the processor of the computing device 700 (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 706 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 700 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic, or optical signals, which are exemplary forms of wireless communications or data streams that carry various types of information.

Some implementations of the above described may be implemented by the preparation of application-specific integrated circuits or by interconnecting an appropriate network of conventional component circuits, as will be apparent to those skilled in the art. Those of skill in the art would understand that information and signals may be represented using any of a variety of different technologies and techniques. For example, data, instructions, requests, information, signals, bits, symbols, and chips that may be referenced throughout the above description may be represented by voltages, currents, electromagnetic waves, magnetic fields or particles, optical fields or particles, or any combination thereof.

While various implementations of the present disclosure have been shown and described herein, it will be obvious to those skilled in the art that such implementations are provided by way of example only. Numerous variations, changes, and substitutions will now occur to those skilled in the art without departing from the disclosure. For example, collaboration engine 200 may identify opportunities for collaboration on a file even when users are not currently in an editing session, and may invite the users to collaborate via email or when the user next accesses the cloud computing service. Also, in determining whether to invite a user to collaborate on a primary file, collaboration engine 200 may refer to only the user preferences of the creator of the primary file, or of the preferences of all the users authorized to edit the primary file, or of some other suitable set of users. It should be understood that various alternatives to the implementations of the disclosure described herein may be employed in practicing the disclosure. Elements of an implementation of the systems and methods described herein may be independently implemented or combined with other implementations. It is intended that the following claims define the scope of the disclosure and that methods and structures within the scope of these claims and their equivalents be covered thereby.

We claim:

1. A computer-implemented method of online document collaboration, comprising a processor at a server configured for:
identifying a first user associated with a first document editing session associated with a first file;
identifying a second user associated with a second document editing session associated with a second file;
storing a user similarity score between the first user and the second user in a user database;
storing a document similarity score between the first file and the second file in a resource database;
calculating a session similarity score between the first document editing session and the second document editing session, wherein the session similarity score is a combination of the user similarity score, the document similarity score, and historical data of users acceptance of suggestions to collaborate;
determining whether the session similarity score is greater than a threshold; and suggesting, in response to determining that the session similarity score is greater than the threshold, adding the second user as a collaborator to the first document editing session.

2. The method of claim 1, wherein calculating the session similarity score further includes calculating a weighted average of the user similarity score and the document similarity score, and wherein weights are based on a confidence measurement.

3. The method of claim 2, wherein calculating the session similarity score further includes calculating the confidence measurement based on an amount of data used to calculate the user similarity score and the document similarity score.

4. The method of claim 1, wherein calculating the document similarity score is based in part on words, phrases and topics identified using natural language processing on a first document in the first document editing session and on a second document in the second document editing session.

5. The method of claim 4, wherein calculating the document similarity score is based in part on an image analysis of images in the first document editing session and the second document editing session.

6. The method of claim 5, wherein calculating the document similarity score is based in part on characteristics of users that have previously accessed or edited the first document in the first document editing session and the second document in the second document editing session.

7. The method of claim 6, further comprising:
identifying a first plurality of users associated with the first document;
identifying a second plurality of users associated with the second document; and
wherein the user similarity score is further based on a weighted average of pairwise user similarity scores between each of the first plurality of users and the second plurality of users.

8. The method of claim 7, further comprising adjusting the weighted average based on an amount of time each user in the first plurality of users and the second plurality of users has spent editing the first document.

9. The method of claim 1, wherein determining whether the session similarity score is greater than the threshold further comprises determining the threshold based on pairwise session similarity scores for ail editing sessions on a cloud computing system.

10. The method of claim 1, further comprising revising a weight used to calculate the session similarity score in response to the second user not joining the first document editing session when suggested.

11. A system for online document collaboration, comprising:
a document hardware processor in communication with:
a resource database comprising a memory for storing a document similarity score between a first file and a second file;
a user database comprising a memory for storing a user similarity score between a first user and a second user;
wherein the document hardware processor is configured to:
identify the first user, wherein the first user is associated with a first document editing session associated with the first file;
identify the second user, wherein the second user is associated with a second document editing session associated with the second file;
calculate a session similarity score between the first document editing session and the second document editing session, wherein the session similarity score is a combination of the user similarity score, the document similarity score, and historical data of users acceptance of suggestions to collaborate;
determine whether the session similarity score is greater than a threshold; and
suggest, in response to determining that the session similarity is greater than the threshold, adding the second user as a collaborator to the first document editing session.

12. The system of claim 11, wherein the session similarity score is a weighted average of the user similarity score and the document similarity score, and wherein weights are based on a confidence measurement.

13. The system of claim 12, wherein the confidence measurement is based on an amount of data used to calculate the user similarity score and the document similarity score.

14. The system of claim 11, wherein the document similarity score is based in part on words, phrases and topics identified using natural language processing on a first document in the first document editing session and on a second document in the second document editing session.

15. The system of claim 14, wherein the document similarity score is based in part on an image analysis of images in the first document editing session and the second document editing session.

16. The system of claim 15, wherein the document similarity score is based in part on characteristics of users that have previously accessed or edited the first document in the first document editing session and the second document in the second document editing session.

17. The system of claim 16, wherein the document hardware processor is further configured to:
- identify a first plurality of users associated with the first document;
- identify a second plurality of users associated with the second document; and
- wherein the user similarity score is further based on a weighted average of pairwise user similarity scores between each of the first plurality of users and the second plurality of users.

18. The system of claim 17, wherein the weighted average is adjusted based on an amount of time each user in the first plurality of users and the second plurality of users has spent editing the first document.

19. The system of claim 11, wherein the threshold is determined based on pairwise session similarity scores for all editing sessions on a cloud computing system.

20. The system of claim 11, wherein a weight used to calculate the session similarity score is revised in response to the second user not joining the first document editing session when suggested.

* * * * *